Fig.2.
Fig.3.
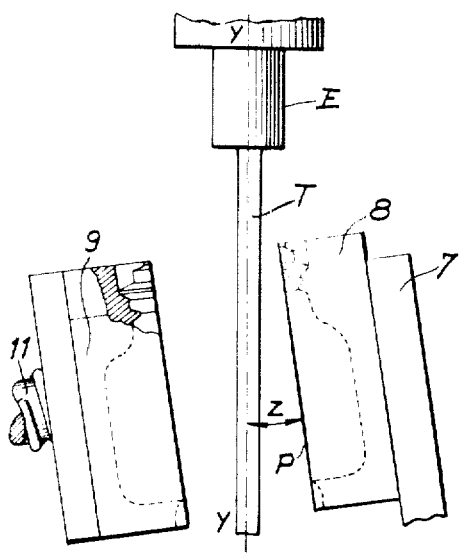
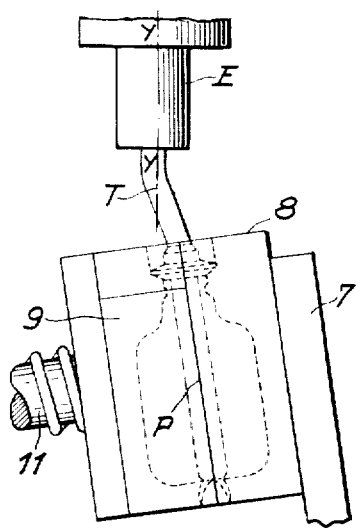

United States Patent Office 3,345,686
Patented Oct. 10, 1967

3,345,686
MACHINE FOR MANUFACTURING PLASTIC
CONTAINERS
Antoine di Settembrini, 42 Residence du Petit Val,
Sucy-en-Brie, France
Filed Oct. 6, 1964, Ser. No. 401,824
Claims priority, application France, Nov. 21, 1963,
954,541, Patent 1,392,517; first addition July 10, 1964,
981,455
1 Claim. (Cl. 18—5)

ABSTRACT OF THE DISCLOSURE

In a machine for molding bottles of thermoplastic material by extrusion and blowing, which comprises a support rotatably movable about an axis, and means for rotatably driving said support continuously, a plurality of molds mounted on said support, the improvement consisting in that the axis of rotation of said mold support is inclined to the horizontal whereby the joint plane of the fixed half-molds has the same inclination with respect to the extrusion axis of said parison, in a direction such that the end of each fixed half-mold which is nearest to the extruder, when the corresponding mold registers with the extruder, is nearer to the parison than the opposite end of said half-mold.

---

This invention relates to the manufacture of plastic containers and has specific reference to a machine designed for manufacturing plastic bottles.

This machine pertains to the known type wherein a number of molds are conveyed continuously past an extruder producing a tubular blank or parison of plastic material. Each mold is reclosed in succession on a parison section and the latter is subjected within the mold to an expansion by internal blowing so as to take the exact shape of the mold impression which corresponds to that of the desired bottle. Subsequent to this shaping step and after a sufficient cooling time the mold is opened to permit the stripping and release of the shaped bottle, and the same cycle is resumed with a fresh mold.

One object of this invention consists in improving a machine of the type set forth hereinabove to enable this machine to treat an extruded parison charged with static electricity.

Other features and advantages of this invention will appear as the following description proceeds with reference to the accompanying diagrammatic drawings in which:

FIGURE 2 is a diagrammatic view showing an open mold registering with the extruder;

FIGURE 3 is a view similar to FIGURE 2 but with the mold closed.

Figure 1:
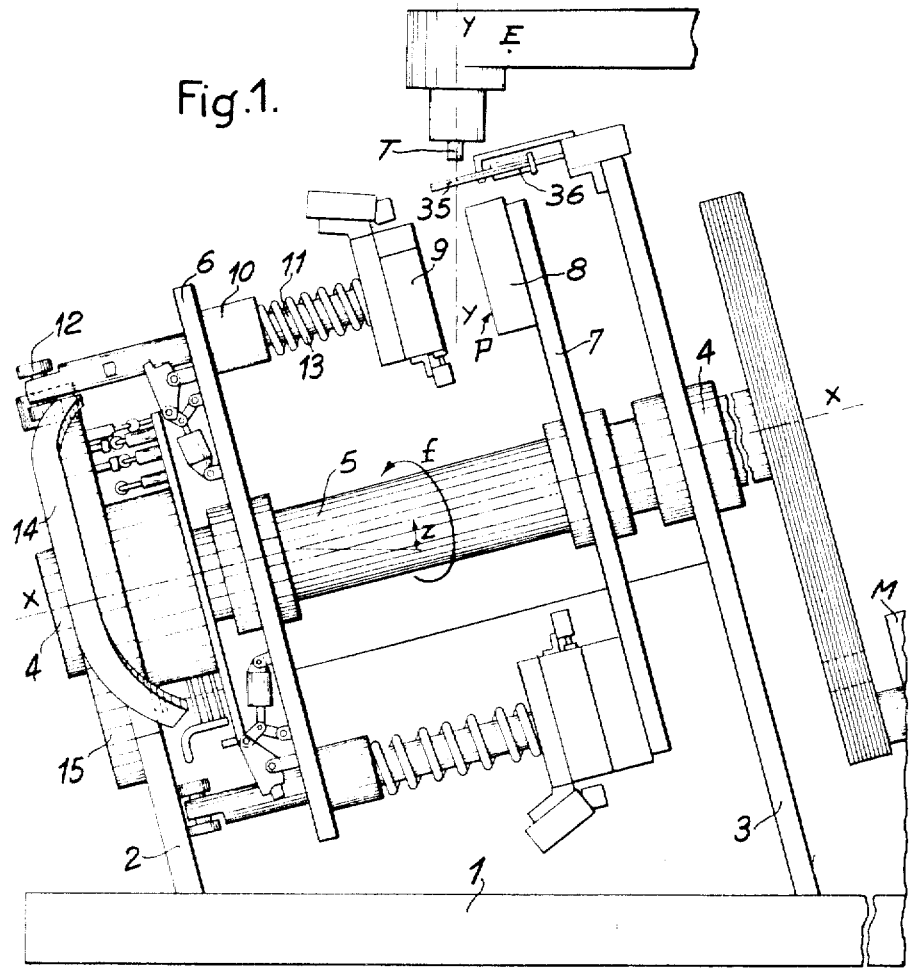
FIGURE 1 is a diagrammatic elevational view showing another form of embodiment of the machine of this invention.

The machine according to this invention comprises a frame structure consisting essentially of a base plate or bed 1 and a pair of parallel inclined side flanges 2, 3. These flanges carry bearings 4 in which a main shaft 5 is journalled for rotation about the axis XX; this shaft 5 is driven continuously in the direction of the arrow *f* (FIGURES 1 to 3) from a motor and variator unit M through adequate belt and pulley transmission means.

The extruder unit E shown only in very diagrammatic form in the drawing is carried by the aforesaid frame structure. The extrusion head is disposed according to a vertical axis YY intersecting the axis XX of shaft 5. This extruder E produces a tubular blank or parison T for example of rigid polyvinyl chloride.

The machine comprises furthermore a rotary mold support, the molding impression or cavities of these molds having the shape and dimensions of the bottles to be manufactured. This support may assume substantially the shape of a rotary drum.

The rotary mold support mounted on shaft 5 consists of a pair of parallel inclined circular plates 6, 7 rigid with shaft 5 and carrying metal molds. The molds disposed at spaced annular intervals at the outer periphery of the plates consist of two portions or mold halves, that is, a fixed half-mold 8 and a movable half-mold 9, these half-molds being separated from each other by a joint plane P. Plate 7 carries the fixed half-molds 8 secured thereon (on the side of the extruder E) and plate 6 carries the movable half-molds 9 but so mounted as to be movable in a direction parallel to the shaft axis XX. To this end the plate 6 carries on its outer peripheral portion as many sockets 10 as there are molds in the machine. These sockets register with the fixed half-molds 8. Each socket 10 has slidably mounted therein a rod 11 carrying at one end the corresponding movable half-mold 9 and at the opposite end a pair of rollers 12 engaging a cam face of the mold opening and closing mechanism to be described presently. Each movable half-mold 9 is resiliently urged to its closed position, that is, in engagement with the corresponding fixed half-mold, by a return coil spring 13 surrounding the rod 11 and reacting between the movable half-mold 9 and the relevant socket 10, as shown.

The movement of translation parallel to the axis XX which is imparted to the movable mold halves 9 for opening and closing the molds is obtained by using mechanical means comprising a cam member 14 carried by an annular plate 15 concentric with the axis XX and secured on the lateral flange 2 of the frame structure of the machine.

According to the invention the axis XX of shaft 5 is inclined and forms an angle z to the horizontal. Therefore, the joint plane P of the half-molds forms with the axis YY of the extruder the same angle as this angle z, whereby the upper portion of the fixed half-mold 8, that is, the one nearest to the extruder E, be nearer to the axis YY than the lower portion of this half-mold.

In FIGURE 2 a mold is shown in its open position. When a sufficient tubular parison section T has been extruded to correspond to the mold height the mold is reclosed (see FIGURE 3) by moving the movable half-mold 9 towards the fixed half-mold 8 and a shearing device 35, 36 (FIGURE 1) cuts off the tubular parison T as the mold is re-closed.

This arrangement is advantageous in that the lower portion of the tubular blank is relatively remote from each half-mold. This is particularly advantageous when the extruded material is charged with statical electricity, for the risk of being attracted by the fixed half-mold and of adhering thereto, thus interferring with the natural downward movement of the parison, is definitely precluded.

The same applies if, during the downward movement, the tubular parison tends to assume a curved configuration.

The machine of this invention is also suitable for use in the manufacture of bottles of any desired thermoplastic material, whether organic or inorganic, that is, any material adapted to soften in a reversible manner under the action of heat.

What I claim is:

In a machine for molding bottles of thermoplastic material by extrusion and blowing, which comprises a support rotatably movable about an axis, means for rotatably driving said support continuously, a plurality of molds mounted on said support at regular angular intervals about its axis of rotation, each mold being divided into two portions by a joint plane and comprising a fixed half-mold carried by said support through means permitting its movement in a direction parallel to said axis of rotation, an extruder producing a continuous tubular parison of thermoplastic material along a vertical extrusion axis contained in the vertical plane extending radially from the axis of rotation of said mold support, means for causing said molds to move continuously under said extruder, and blowing means associated with each mold, the improvement consisting in that the axis of rotation of said mold support is inclined to the horizontal whereby the joint plane of the fixed half-molds has the same inclination with respect to the extrusion axis of said parison, in a direction such that the end of each fixed half-mold which is nearest to said extruder, when the corresponding mold registers with the extruder, is nearer to the parison than the opposite end of said half-mold.

References Cited

UNITED STATES PATENTS 2,515,093    7/1950    Mills _____ 18—5

FOREIGN PATENTS 1,244,287    9/1960    France.

J. SPENCER OVERHOLSER, *Primary Examiner.*

WILBUR L. McBAY, *Examiner.*